Jan. 13, 1942.  R. E. SCHENSTED  2,270,198
PROJECTOR FOR MOTION PICTURES IN COLOR AND IN THREE DIMENSIONS
Filed April 1, 1940  4 Sheets-Sheet 1

Roy E. Schensted INVENTOR
BY Bush & Bush
ATTORNEYS.

Jan. 13, 1942.　　　R. E. SCHENSTED　　　2,270,198
PROJECTOR FOR MOTION PICTURES IN COLOR AND IN THREE DIMENSIONS
Filed April 1, 1940　　　4 Sheets-Sheet 3

Roy E. Schensted INVENTOR.
BY Bush & Bush
ATTORNEYS.

Jan. 13, 1942.  R. E. SCHENSTED  2,270,198
PROJECTOR FOR MOTION PICTURES IN COLOR AND IN THREE DIMENSIONS
Filed April 1, 1940  4 Sheets-Sheet 4

Ray E. Schensted INVENTOR.
BY Bush & Bush,
ATTORNEYS

Patented Jan. 13, 1942

2,270,198

UNITED STATES PATENT OFFICE 2,270,198

PROJECTOR FOR MOTION PICTURES IN COLOR AND IN THREE DIMENSIONS

Roy E. Schensted, Clarion, Iowa, assignor of one-half to B. J. Palmer, Scott County, Iowa Application April 1, 1940, Serial No. 327,164

15 Claims. (Cl. 88—16.4)

My invention relates to projectors for motion pictures in color and in three dimensions.

The objects of my invention are to provide film strips containing in spaced relation parts of right and left pictures, the two pictures of each pair being taken simultaneously but each of a given pair being taken through a color lens carrying a color opposite to the color of the screen through which the other picture of said pair is taken, and each pair of pictures being taken through color screens substantially opposite to color screens used for the preceding and succeeding pairs of pictures; together with a projector for simultaneously projecting the pairs of pictures successively from such a film to a single area upon a silver screen through color screens corresponding to the screens through which the pictures were taken, and successively projecting the sequential pairs of pictures through oppositely polarizing plates by which the right and left pictures may be made visible to the right and left eyes respectively of an observer viewing them through corresponding polarizing plates.

As the subject of color "is complicated by a somewhat confused and unsettled vocabulary," I use the term "opposite colors" to indicate pairs of colors from the warm and cool parts of the spectrum such as red and blue, or orange and green, red and orange being so-called warm colors and blue and green being so-called cool colors. For convenience I refer to the color pairs preferred by me as the "blue-red pair" and as the "green-orange pair," but it should be noted that I do not limit my invention to the precise four colors named, as modifications formed by variations in the relative proportions of the additive primary colors and the subtractive primary colors may be utilized without departing from the spirit of my invention; to provide apparatus which can be attached to the motion picture projectors now in common use to produce the visual effects stated by use of films herein described; to provide motion picture films which can be utilized with the apparatus described to produce the visual effects stated. I use the terms "right" and "left" pictures to designate the pictures taken by the right and left lenses respectively of a stereoscopic camera, such cameras being well known and in common use.

I accomplish these objects by the means shown in the accompanying drawings, in which.

Similar numerals refer to similar parts throughout the several views.

Figure 1:
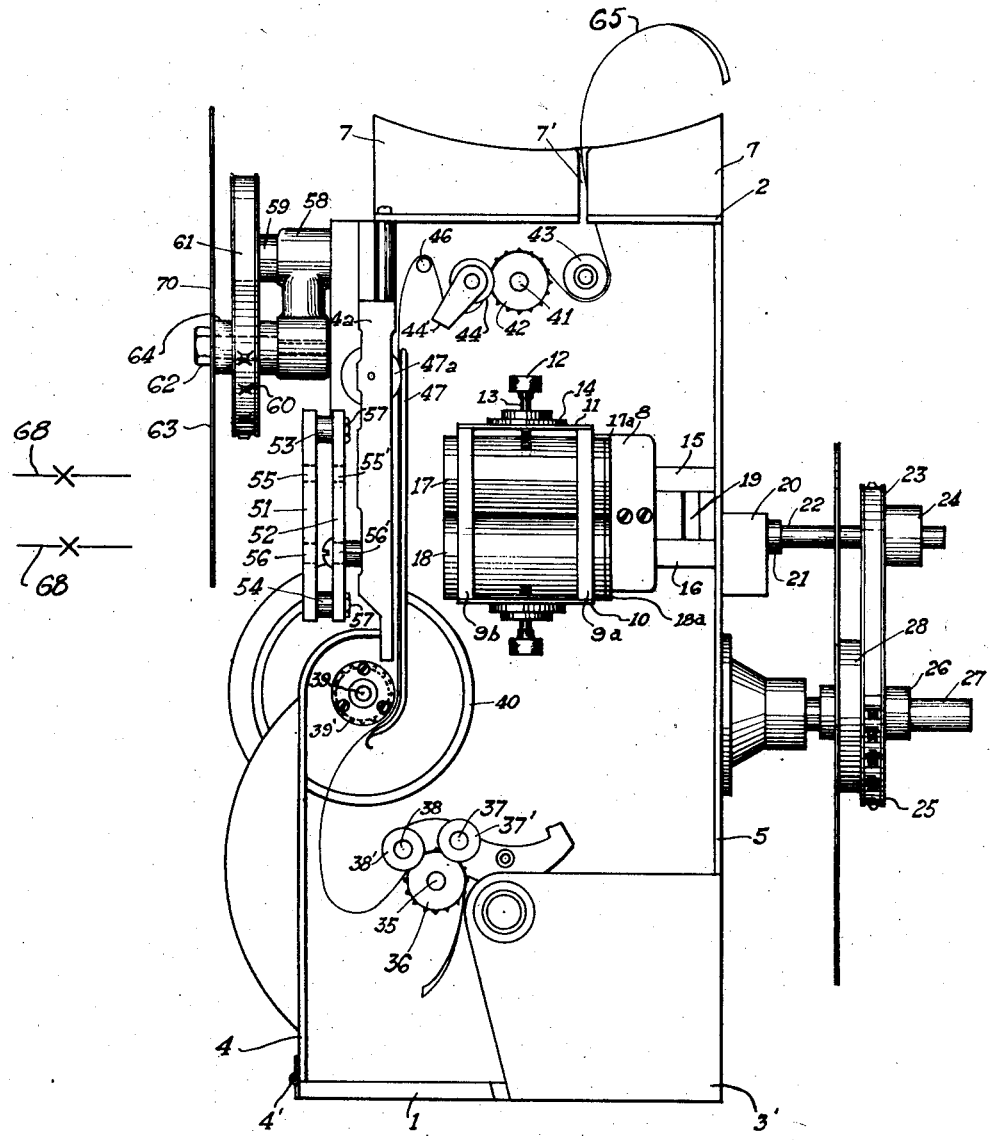
Figure 1 is a side elevation of a projector embodying my improvement in projectors, with the side door of the housing removed to disclose the interior.

My projector apparatus includes a housing with lens supports and film guiding and driving apparatus similar to those in common use, but with the necessary modifications to adapt it to the apparatus herein described.

The projector housing comprises a base 1, top 2, back plate 4, front plate 5, side door 3 with hinge 3a, and side door 6 with hinge 6'. The doors may be solid or provided with glass or other transparent windows and part of one sidewall 3' is rigidly secured to the base and front plate 5.

At the top of the projector housing a rack 7 is secured to form a support for a film casing or reel of the sort in common use. A slot 7' is formed in the rack 7 through which the film 65 may enter the projector from the reel. The general arrangement of the projector housing and reel support is old and in common use.

A spool having sprocket wheels 42 formed on its ends, is revolvably mounted in the projector housing and the film 65 is led around an idler pulley 43 and over the sprocket wheels 42, the prongs of which enter corresponding openings in the edges of the film so as to carry the film forward steadily with the revolution of the sprocket wheels 42, as in the usual apparatus in common use.

An adjustable idler 44 holds the film in contact with the sprockets 42 and has an adjusting lever 44'. The film then passes in a loose loop over a guide bar 46 secured in the housing and thence downwardly and along a pressure plate 47 which holds the film in contact with a guide roller 47a and guides the film along and past the lenses 17 and 18 and the openings 55' and 56' through which the light comes from the arc or other lamps 68.

Bars 15 and 16 which may be formed integral, are mounted in the housing. A supporting bar 19 is slidably mounted between the bars 15 and 16 and has a small rack 45b united thereto which engages a gear 45a mounted upon the lower end of the adjusting shaft 45. A handle 45' is united to the top of the shaft 45 by which the shaft may be manually rotated so as to move the bar 19 forward or backward to focus the lenses.

The bar 19 has united thereto a support 8 preferably in the form of an angular bar, to one end of which is secured a bar 9 of a carriage comprising bars 9, 9a, 9b and 9c and top and bottom plates 11 and 10.

In this carriage the lenses 17 and 18 are mounted with adjusting screws 13 and 13a to adjust their height. Polarizing plates 17a and 18a are secured over the front end of the lenses whereby rays of light coming from one lens will be polarized in vertical planes and those coming from the other lens will be polarized in horizontal planes.

A spaced pair of plates 51 and 52, preferably of heat resistant material, is mounted upon the rear wall of the projector having openings 55, 55', 56 and 56' in line with the centers of the lenses. Through these openings light rays from arc lamps 68 or other suitable illuminator may pass through the film 65 and thence through the lenses and polarizing plates and forwardly to the silver screen, which is not shown but which may be a screen of any of the forms in common use.

I use the term "silver screen" to designate any of the large screens of cloth, metal or other material in common use for the exhibition of pictures projected thereon by motion picture and other cameras, stereopticons, etc. to distinguish such screen from the color screens and polarizing plates contained in my apparatus.

The lower end of the film passes over a sprocket wheel 39' mounted upon a shaft 39 which in turn is intermittently driven by a Geneva movement within the housing 40. This form of drive is in common use and it is unnecessary to describe it in detail.

A continuously driven lower sprocket wheel 36 receives the film as it comes from the loop formed by the action of the Geneva movement and carries it to the rewinding spool or reel which may be in any of the forms in common use.

The sprockets 42 and 36 are driven simultaneously at the same speeds and the successive pairs of pictures upon the film are preferably spaced four frames apart. The Geneva movement is planned to carry the film forward intermittently a distance of two frames at each operation.

Figure 6:
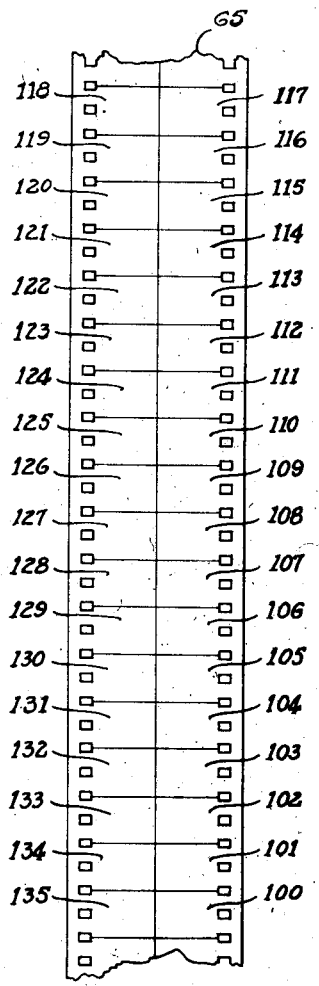
Figure 6 is an enlarged plan view of a section of the film used in my apparatus.

The pairs of pictures are arranged upon the film as follows, with reference to Figure 6:

Frame or picture No. 100, being a right picture taken through and projected through a blue color screen, is projected simultaneously with left picture No. 105, which is taken and also projected through a red color screen. Right picture No. 102 taken through an orange color screen, is projected through an orange color screen simultaneously with left picture No. 107 which is projected through a green color screen.

Right picture No. 104 is taken and projected through a blue color screen and projected simultaneously with left picture No. 109, taken and projected through a red color screen, and so on in regular progression through the entire length of the film.

For economy in films, I prefer to use films carrying two separate and distinct sets of pictures arranged side by side and in such cases, after one set of pictures has been shown, the film can be reversed and the other set shown.

In taking the pictures the sequence described above must be followed and the camera is arranged to take the two pictures in each pair simultaneously and to take the pairs in the sequence stated and with successive similar pairs spaced four frames apart, that is, with four frames or pictures intervening between them. By similar pairs I mean successive pairs taken through the same color screens.

In taking the pictures through color screens, it is obvious that each frame will contain only so much of a complete scene photographed as will act upon the film through the particular color screen used. Thus, no one of the frames will contain a complete picture, and it will be necessary for four different frames to be exhibited to enable the observer to get the visual effect of the entire scene photographed.

With my projector, this will be accomplished by the projection of two sequential pairs of pictures and the motion of the projector should be rapid enough to produce the visual effect of continuity.

In order to make the pictures appear in colors, I provide a color screen revolvably mounted in front of the lenses carrying color plates of glass, Cellophane or other suitable material, and colored to correspond with the color screens of the camera through which the pictures were taken.

To produce the correct visual effect both for taking and projecting the pictures, I prefer to use blue, red, green and orange colored screens, and to alternate blue and orange screens for the right pictures and to alternate red and green screens for the left pictures, the exposures through the blue and red screens being simultaneous and the exposures through the orange and green screens being simultaneous.

Likewise, the projection through the blue and red screens would be simultaneous and the projection through the orange and green screens would be simultaneous. I find that this arrangement will give better visual results than the use of three primary colors alone.

The stereoscopic or three dimensional visual effect is produced by the use of a stereoscopic camera in which two spaced-apart frames of the film are exposed through separate lenses, the lenses being spaced apart horizontally far enough to correspond to the spacing of the eyes of a person, with such variation as may be necessary on account of the differences in distance between the camera and the subject photographed and between the eyes of an observer and the silver screen upon which the pictures are projected; also by the use of the polarizing screens in the projector by which the rays of light for the right pictures are polarized at one angle and the rays of light for the left pictures are polarized at right angles to those of the right pictures, the observer being provided with corresponding screens by which the right eye will perceive only the right picture and the left eye only the left picture as projected upon the screen.

Figure 2:
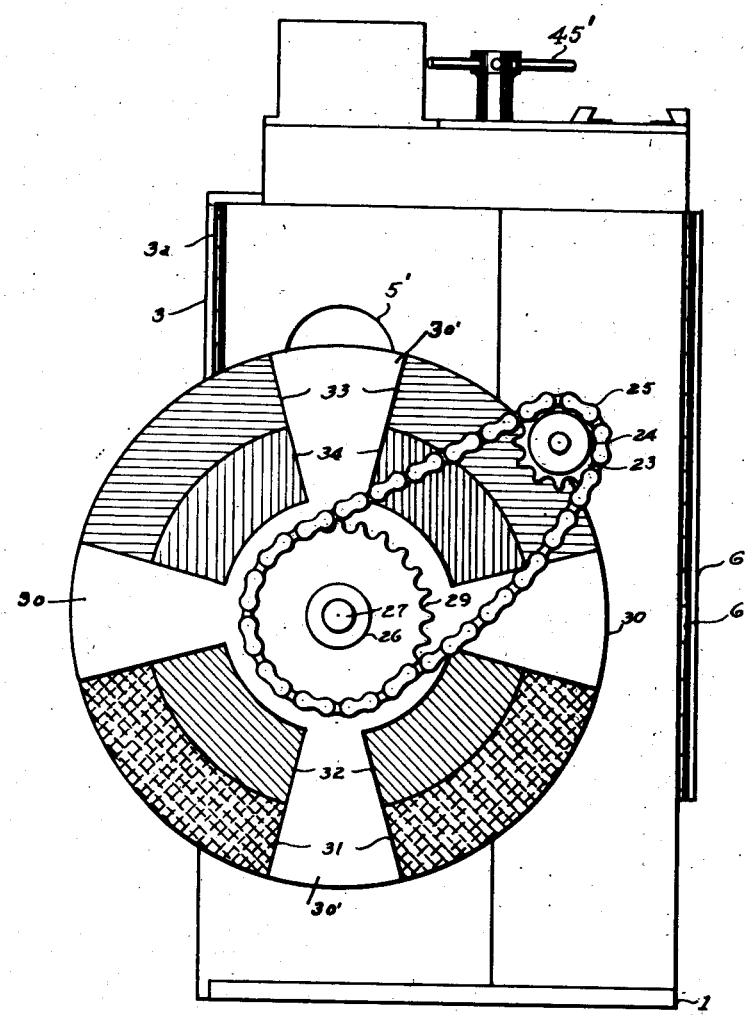
Figure 2 is a front elevation.
Figure 3:
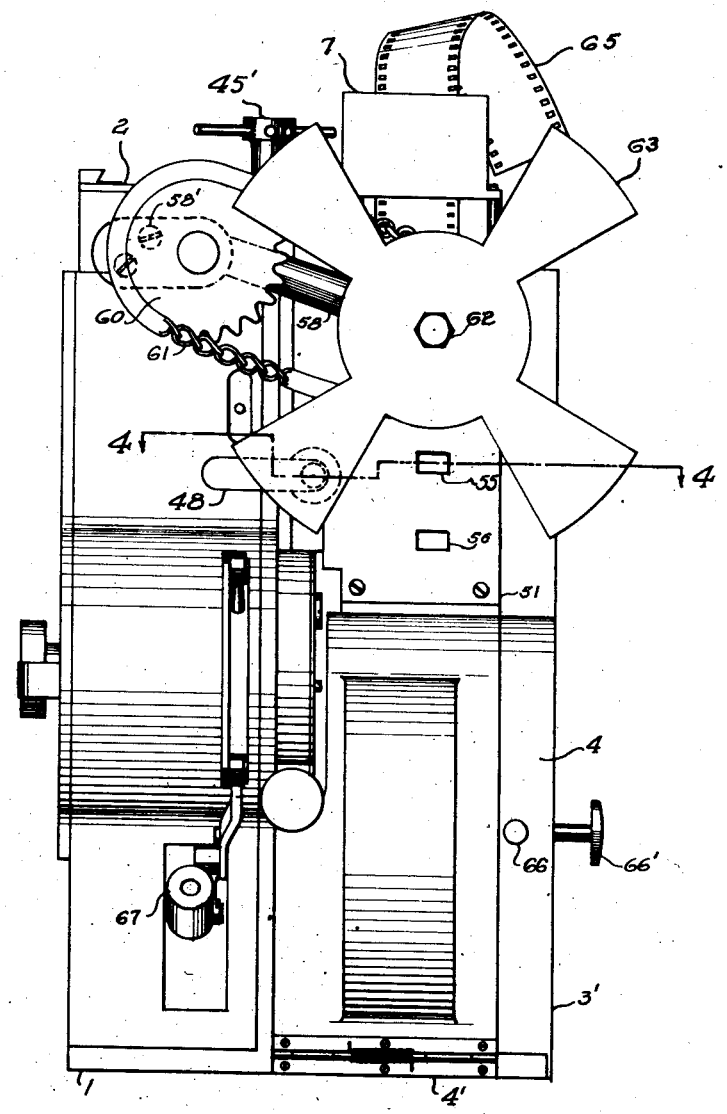
Figure 3 is a rear elevation.
Figure 4:
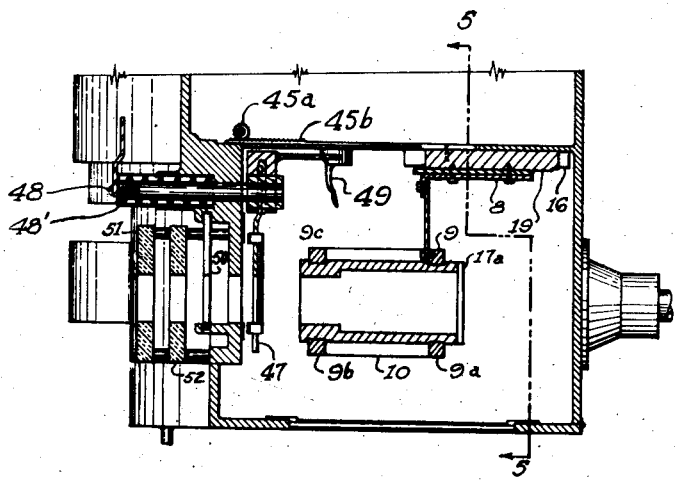
Figure 4 is a sectional detail on the line 4—4 of Figure 3.
Figure 5:
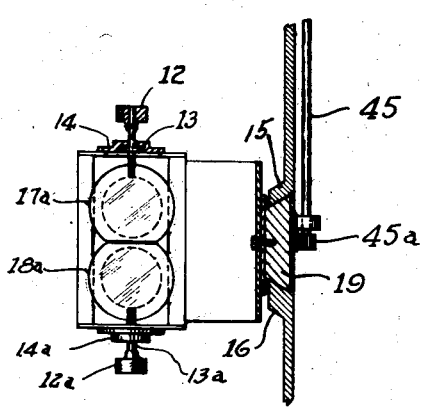
Figure 5 is a detail partly in section on the line 5—5 of Figure 4.

The color screens are mounted upon a rotatable wheel as shown in Figure 2, which wheel is provided with four arms 30 and 30' of opaque material and the color screens are arranged in inner and outer pairs of colors. In Figure 2 I have shown the outer color screen 33 as colored blue and screen 31 as orange and the inner screen 34 as colored red and the inner screen 32 as green. Each screen extends a little less than half way around the wheel, but the opaque arms 30' are secured at the middle of each color screen to cut down the illumination at the middle of the exposure of each color to correspond to the extent to which the illumination is cut down by non-flicker bars 30.

The color screen wheel is rigidly mounted upon the shaft 27 which may be driven by a sprocket 29 which in turn is driven by a sprocket chain 25 carried by a sprocket wheel 24 upon a shaft mounted in the housing and driven by any of the means in common use, this form of drive not being a part of my invention.

A shutter wheel 70 is mounted in the frame upon a shaft 62 secured in the lower end of an arm 58 united to the upper end of the rear of the housing. A shaft 59 is revolvably mounted in the upper part of the arm 58 and carries a sprocket wheel 61 upon which a sprocket chain 60 is mounted which passes over and drives a sprocket wheel 64 to which the shutter 70 is united. Any desired means of drive may be utilized to operate the shaft 59 and shutter 70.

The shutter 70 is provided with four arms 63 which are driven at the same speed and synchronized with the opaque bars 30 and 30' of the color screen wheel. The bars 63 pass between the lamps 68 and the openings 55 and 56 in the plate 51 and act to shut off the light intermittently from the lenses.

A catch 66 is provided to hold the door 4 closed and the door 4 may be provided with a knob 66', but the door catch and knob are old structures in common use and not a part of my invention.

In the operation of my machine, a positive film is first prepared showing the different pictures in the sequence outlined above. This film is mounted upon a reel in the ordinary way and led into the top of the camera and around the sprocket wheels 42, idler 44, guide bar 46, and down between the pressure plate 47 and the idler pulley 47a, thence down past the openings 55' and 56' and partially around the sprockets of the sprocket wheel 39', being held in place against these sprockets by the curved lower end of the pressure plate 47 which may be mounted upon the shaft of an adjusting apparatus 48 having a spring 48' to retrain the pressure plate 47 in closed position and a handle by which the supporting bar may be moved in or out in order to feed the film into place behind the pressure plate 47. This adjusting apparatus is old and I make no claim for it.

The sprocket 39' is actuated by a Geneva movement which carries the film 65 forward intermittently two frames at a time and the frames are so spaced on the films that the right pictures are exposed only through one lens and the left pictures are exposed only through the other lens, the lenses being focused so as to project the respective pictures to the same area of the silver screen.

When thus projected, the pictures taken through the blue and red screens will be projected simultaneously upon the silver screen and the right eye of the observer looking through a polarized screen will observe the part of the picture taken through the blue screen and the left eye looking through an oppositely polarized screen will view the portion of the picture taken through the red color screen for two intervals or periods separated by the passage of one of the opaque arms 30'.

The Geneva movement will then act and carry the film forward and the right-eye will then perceive through its polarizer the next sequential picture, being one taken through an orange screen and simultaneously therewith the left eye will perceive the picture of the portion of the scene photographed through the green screen.

The speed of the projector will be so timed that the visual effect upon the observer will be practically the same as the effect of viewing the entire scene by the observer for a corresponding period of time would be. Thus the observer will get the effect of stereoscopic pictures produced from colored films in colors corresponding to the natural colors of the scene photographed.

By this apparatus, and by my method of taking and projecting the pictures, the great expense incident to coloring the films is avoided and likewise, the difficulties arising from fading of the colored films are avoided, and more natural and more brilliant colors will appear than those commonly produced by the colored films; so also the coloring will be more accurately outlined than can be done by hand.

In the motion picture apparatus heretofore in use where two or more pictures have been projected simultaneously to the viewing screen and superimposed thereon, there has been difficulty in securing an exact registration of the two pictures without which blurring would occur; and, in stereoscopic pictures, parallax has tended to increase the blurring. Likewise, in the various color picture systems, inexact registration has tended to produce color fringing and blurring where two pictures were projected simultaneously. The films in common use are subject to shrinkage and warping which also interfere with exactly registering the pictures upon the viewing screen. I overcome these difficulties by the use of polarizers so that while the two eyes see simultaneously, they see different pictures and different colors and in this way the accommodative power of the eyes overcomes the inexact registration of the pictures and produces the natural effect of more exact registration, both in position and color. Furthermore, the eyes, by separating the colors in this way, add to the impression of depth or third dimension produced by the spacing of the lenses during the taking of the pictures.

Another new feature of my method is that I alternate the colors for the right eye so that it sees in alternation a denser and a brighter color— that is, colors permitting less and greater light intensities to reach the eye, and the same is true of the left eye. Thus a warm color right picture is followed by a cool color right picture, and a cool color left picture is followed by a warm color left picture, etc. At the same time, while a warm color picture is viewed by one eye, a cool color picture is viewed by the other eye, and vice versa. It is well known that the different colors vary to a large extent the amount of light transmissible therethrough and hence the brightness or intensity of the light rays reaching the eyes of an observer. My arrangement tends to balance the light received by the eyes and to relieve the eye strain ensuing from unbalanced continuous exposure of one eye to a brighter light and the other to a continuous exposure to a reduced light. It also makes it unnecessary to vary either the width of the color screens or the length of time of exposure to the differently colored screens in projecting the pictures.

While I have shown in the drawings a four-color screen with red, green, blue and orange colors (Fig. 1), that is intended to be illustrative of colors from warm and cool sections of the spectrum and not to limit my description and claims to those precise colors.

I am aware that polarizers and analyzers have been used in connection with stereoscopic pictures and that color screens and color films have been used either separately or together in various different arrangements and also that many difficulties have been pointed out by various inventors in their respective applications for patents heretofore issued, but so far as I am aware, no prior inventor has used the particular combination described by me to accomplish the results sought to be accomplished by my invention nor has anyone attempted to present to the right and left eyes respectively of the spectator the right and left fractional pictures necessary to make a complete group, using the term "group" to indicate an assemblage of the fractions necessary to form a complete stereoscopic picture of a given view in such a way that the warm and cool colors will act in succession upon each eye and the warm and cool colors acting upon one eye will act simultaneously with the cool and warm colors acting upon the other eye, whereby the light intensities acting upon each eye will vary with the colors presented thereto and will alternate in accordance with the alternation of the colors. The results thus obtained are due to the combination of all the elements set out above and by this arrangement the eye strain arising from the continuous presentation of a more intense light to one eye while the light of less intensity is presented continuously to the other eye, will be avoided or greatly relieved.

I do not limit my claims to the precise apparatus shown in the drawings, because it is obvious that various modifications thereof may be made without departing from the spirit of my invention.

I claim:

1. A motion picture projector comprising a housing, a pair of spaced lenses adjustably mounted thereon for focusing upon a single given area of a silver screen, a lamp, an apertured plate mounted between the lamp and the lenses with the apertures in line with the lamp and the centers of the lenses, polarizing screens of opposite polarity mounted at one end of the respective lenses, a rotatable screen carrying segmental inner and outer transparent color plates or screens arranged in pairs, one inner segment and its corresponding outer segment being occupied by a blue color screen and by a red color screen respectively and alternating inner and outer segments being occupied by an orange color screen and by a green color screen respectively, the inner color segments traveling across the path of light rays going through one of the lenses and the outer color segments traveling across the path of the other lens, a Geneva movement and sprockets for intermittently moving the film along the apertured plate, a rotatable shutter mounted to rotate between the lamp and the lenses, and driving means for rotating the shutter and color screens simultaneously.

2. A motion picture projector comprising a housing, a pair of spaced lenses adjustably mounted thereon for focusing upon a single given area of a silver screen, an apertured plate mounted adjacent the lenses with the apertures in line with the centers of the lenses, polarizing screens of opposite polarity mounted at one end of the respective lenses, a rotatable screen carrying segmental inner and outer transparent color plates or screens arranged in pairs, one inner segment and its corresponding outer segment being occupied by a blue color screen and by a red color screen respectively and alternating inner and outer segments being occupied by an orange color screen and by a green color screen respectively, the inner color segments traveling across the path of light rays going through one of the lenses and the outer color segments traveling across the path of the other lens, a Geneva movement and sprockets for intermittently moving the film along the apertured plate, a rotatable shutter mounted to rotate adjacent the lenses, and driving means for rotating the shutter and color screens simultaneously.

3. A motion picture projector comprising a housing, a pair of spaced lenses adjustably mounted thereon for focusing upon a single given area of a silver screen, a lamp, an apertured plate mounted between the lamp and the lenses with the apertures in line with the lamp and the centers of the lenses, polarizing screens of opposite polarity mounted at one end of the respective lenses, a rotatable screen carrying in alternate segments pairs of inner and outer transparent color plates or screens, one inner segment and its corresponding outer segment being occupied by a blue color screen and by a red color screen respectively and the alternating inner and outer segments being occupied by an orange color screen and by a green color screen respectively, the inner color segments traveling across the path of light rays going through one of the lenses and the outer color segments traveling across the path of the other lens, a Geneva movement and sprockets for intermittently moving the film along the apertured plate, a rotatable shutter mounted to rotate between the lamp and the lenses, driving means for rotating the shutter and color screens simultaneously, and opaque segments interposed respectively between the color segments.

4. A motion picture projector as described in claim 3, and opaque segments interposed respectively in the middle of each color segment.

5. A projector as described in claim 1, and a picture film carrying successive series of spaced positive stereoscopic pictures thereon, each series comprising a right picture taken by one lens through a blue color screen and a left picture simultaneously taken through a red color screen by the other lens of a stereoscopic camera, succeeded by a right picture taken through an orange screen by the first mentioned lens and a left picture taken through a green color screen by the other lens of said camera.

6. In a motion picture projector the combination with a housing, of a pair of spaced lenses adjustably mounted thereon for focusing upon a single given area of a silver screen, a lamp, an apertured plate mounted between the lamp and the lenses with the apertures in line with the lamp and the centers of the lenses, polarizing screens of opposite polarity mounted at one end of the respective lenses, a rotatable screen carrying in alternate segments inner and outer colored plates or screens arranged in pairs, one inner segment and its corresponding outer segment being occupied by a blue color screen and a red color screen respectively and the alternating inner and outer segments being occupied by an orange color screen and a green color screen respectively, means for intermittently moving the film along the apertured plate, a rotatable shutter mounted to rotate between the lamp and the lenses, means for rotating the shutter and color screens simultaneously, and means for continuously driving the film intermittently.

7. A combination as set out in claim 6, and a picture film carrying successive series of spaced positive stereoscopic pictures thereon, each series comprising a right picture taken by one lens through a blue color screen and a left picture simultaneously taken through a red color screen by the other lens of a stereoscopic camera, succeeded by a right picture taken through an orange screen by the first mentioned lens and a left picture simultaneously taken through a green color screen by the other lens of said camera.

8. In a motion picture projector, a picture film carrying successive series of spaced positive stereoscopic pictures thereon, each series comprising a pair of right and left pictures, the right picture having been taken by one lens through a blue color screen and the left picture simultaneously taken through a red color screen by the other lens of a stereoscopic camera, succeeded by a pair of right and left pictures, the right picture having been taken through an orange screen by the first mentioned lens and the left picture taken through a green color screen by the other lens of said camera, in combination with means to project the respective pairs of right and left pictures to a given single area on a silver screen simultaneously, and in the sequence in which they were taken.

9. In a motion picture projector, a picture film carrying successive series of spaced positive stereoscopic pictures thereon, each series comprising a pair of right and left pictures, the right picture having been taken by one lens through a blue color screen and the left picture simultaneously taken through a red color screen by the other lens of a stereoscopic camera, succeeded by a pair of right and left pictures, the right picture having been taken through an orange screen by the first mentioned lens and the left picture taken through a green color screen by the other lens of said camera, in combination with means to project the respective pairs of right and left pictures to a given single area on a silver screen simultaneously, and in the sequence in which they were taken, through polarizing screens of opposite polarity for the right and left pictures.

10. A motion picture projector comprising a housing, a pair of spaced lenses mounted thereon adjustable to focus upon a single area of a viewing screen, a light source, an apertured plate mounted between the light source and the lenses with apertures in line therewith, polarizing screens of opposite polarity mounted at one end of the lenses, a rotatable member bearing segmental transparent color screens arranged in pairs, one inner segment being colored with a cool color of the spectrum and its adjacent outer segment being colored with a warm color of the spectrum and the other inner segment being colored with a different warm color of the spectrum and its adjacent outer segment being colored with a different cool color of the spectrum, the inner segments traveling across the path of light rays going through one of the lenses and the outer segments traveling across the light path of the other lens whereby a cool color from either segment will intercept the light rays from one lens simultaneously with a warm color intercepting the light rays through the other lens and the light rays passing through a given lens will always be intercepted alternately by warm and cool colored screens, and means for intermittently moving a picture-bearing film along the apertured plate and driving means for rotating the rotatable member.

11. A motion picture projector as described in claim 10 with a rotatable shutter mounted to rotate between the lamp and the lenses and driving means for rotating the shutter and the color screens simultaneously.

12. A motion picture projector as described in claim 10 in combination with a picture film carrying successive series of spaced positive stereoscopic pictures thereon each series comprising two pairs of right and left pictures, the right picture of one pair being taken through a screen bearing a cool color of the spectrum and the left picture of said pair being simultaneously taken through a color screen bearing a warm color of the spectrum, the other pair of each series comprising a right picture taken through a different warm color of the spectrum and a left picture taken through a different cool color of the spectrum, the respective colors through which the pictures of any given series are taken corresponding to the colors borne by the different segments of the rotatable member, and means for driving the film intermittently past the lenses in such timed relation to the movements of the rotatable screens that each picture will be projected through a segment having a color corresponding to the color through which such picture was taken.

13. A motion picture projector comprising a housing, a pair of spaced lenses mounted thereon adjustable to focus upon a single area of a viewing screen, a light source, an apertured plate mounted between the light source and the lenses with apertures in line therewith, polarizing screens of opposite polarity mounted at one end of the lenses, a rotatable screen bearing segmental transparent color screens arranged in pairs, one inner segment being colored with one of the denser colors of the spectrum and its adjacent outer segment being colored with a less dense color of the spectrum, the other inner segment being colored with a different less dense color of the spectrum and its adjacent outer segment being colored with a different denser color of the spectrum, the inner segments traveling across the path of light rays going through one of the lenses and the outer segments traveling across the light path of the other lens whereby a denser color from either segment will intercept the light rays from one lens simultaneously with a less dense color intercepting the light rays through the other lens and the light rays passing through a given lens will be intercepted alternately by denser and less dense colored screens, means for intermittently moving a picture-bearing film along the apertured plate and driving means for rotating the rotatable screen whereby the light passing through either of the polarizing screens will vary with the varying density of the colored segments.

14. A motion picture projector as described in claim 13 in combination with a picture film carrying successive series of spaced positive stereoscopic pictures thereon each series comprising two pairs of right and left pictures taken through screens corresponding in color to the segments of the rotatable screen, means for projecting simultaneously the two pictures of each given pair through the corresponding segments of the rotatable screen, and means for driving the film intermittently past the lenses in such timed relation to the movements of the rotatable screen, that each picture will be projected through a segment of the color screen corresponding in color to the color with which such picture was taken.

15. A motion picture projector comprising a housing, a pair of spaced lenses adjustably mounted thereon for focusing upon a single given area of a silver screen, a lamp, an apertured plate mounted between the lamp and the lenses with the apertures in line with the lamp and the centers of the lenses, polarizing screens of opposite polarity mounted at one end of the respective lenses, a screen carrying segmental inner and outer transparent color plates or screens arranged in pairs, one inner segment and its corresponding outer segment being occupied by a blue color screen and by a red color screen respectively and alternating inner and outer segments being occupied by an orange color screen and by a green color screen respectively, the inner color segments traveling across the path of light rays going through one of the lenses and the outer color segments traveling across the path of the other lens, a Geneva movement and sprockets for intermittently moving the film along the apertured plate, a shutter mounted to travel between the lamp and the lenses, and means for driving the shutter and color screens simultaneously.

ROY E. SCHENSTED.